US008954489B2

(12) United States Patent
Park et al.

(10) Patent No.: US 8,954,489 B2
(45) Date of Patent: Feb. 10, 2015

(54) WIDGET ACTIVATION AND COMMUNICATION METHOD

(75) Inventors: Kyung Mo Park, Seoul (KR); Jae Yeon Song, Seoul (KR); Kook Heui Lee, Suwon-si (KR); Seo Young Hwang, Suwon-si (KR)

(73) Assignee: Samsung Electronic Co., Ltd., Suwon-si (KR)

( * ) Notice: Subject to any disclaimer, the term of this patent is extended or adjusted under 35 U.S.C. 154(b) by 483 days.

(21) Appl. No.: 12/815,658

(22) Filed: Jun. 15, 2010

(65) Prior Publication Data

US 2010/0318601 A1  Dec. 16, 2010

(30) Foreign Application Priority Data

Jun. 15, 2009 (KR) .................. 10-2009-0053113
Oct. 20, 2009 (KR) .................. 10-2009-0099940

(51) Int. Cl.
*G06F 15/16* (2006.01)

(52) U.S. Cl.
CPC .................................... *G06F 15/16* (2013.01)
USPC .......................................... 709/203; 709/217

(58) Field of Classification Search
USPC ........................................................ 709/203
See application file for complete search history.

(56) References Cited

U.S. PATENT DOCUMENTS

| 8,104,044 | B1 * | 1/2012 | Scofield et al. ............... 719/313 |
| 8,196,112 | B1 * | 6/2012 | Cansizlar ...................... 717/126 |
| 2008/0010130 | A1 * | 1/2008 | Pyhalammi et al. ............ 705/14 |
| 2008/0010133 | A1 * | 1/2008 | Pyhalammi et al. ............ 705/14 |
| 2008/0082627 | A1 * | 4/2008 | Allen et al. .................... 709/217 |
| 2009/0070409 | A1 | 3/2009 | Clayton et al. |
| 2009/0094339 | A1 | 4/2009 | Allen et al. |
| 2009/0158193 | A1 * | 6/2009 | Chaudhri et al. ............. 715/779 |
| 2009/0249359 | A1 * | 10/2009 | Caunter et al. ................ 719/315 |
| 2009/0259952 | A1 * | 10/2009 | Nakagawa et al. ........... 715/762 |
| 2009/0313601 | A1 * | 12/2009 | Baird et al. .................... 717/106 |
| 2010/0274815 | A1 * | 10/2010 | Vanasco ........................ 707/798 |

FOREIGN PATENT DOCUMENTS

| KR | 10-2008-0001290 A | 1/2008 |
| KR | 10-2008-0051679 A | 6/2008 |
| KR | 10-2009-0014945 A | 2/2009 |
| WO | 2009/020332 A2 | 2/2009 |

OTHER PUBLICATIONS

Dictionary of Computer Science, Engineering and Technology; Published 2001; p. 444 (Three sheets scanned separately: Dictionary Cover; Copyright page; and "server" definition p. 444).*
Miller; ZDNet; Aug. 9, 2007; "The Missing Sync"; 10 pages.*
Hansberry; Jan. 2, 2003; WebIS; Blog showing Journal Sync as plugin; 5 pages.*
Softpedia; Sep. 5, 2008; Microsoft ActiveSync 4.5 Build 5096 Final Screenshots; 4 pages.*

* cited by examiner

*Primary Examiner* — Richard G Keehn
(74) *Attorney, Agent, or Firm* — Jefferson IP Law, LLP (57) ABSTRACT

A method and apparatus for activating a group widget by a widget client are provided. The method includes receiving widgets from at least one surrounding widget server, analyzing the received widgets and grouping the widgets according to the result of the analysis, generating grouped widgets as a group widget, if an event is received from a user, converting a received event into an event related to a configuration widget of a group widget, transmitting the converted event to a corresponding widget server, and receiving a processing result from the widget server which received the transmitted event.

14 Claims, 3 Drawing Sheets

WIDGET ACTIVATION AND COMMUNICATION METHOD

PRIORITY

This application claims the benefit under 35 U.S.C. §119(a) of a Korean patent application filed on Jun. 15, 2009 in the Korean Intellectual Property Office and assigned Serial No. 10-2009-0053113, and a Korean patent application filed on Oct. 20, 2009 in the Korean Intellectual Property Office and assigned Serial No. 10-2009-0099940, the entire disclosures of both of which are hereby incorporated by reference.

BACKGROUND OF THE INVENTION

1. Field of the Invention

The present invention relates to a widget activation and communication method. More particularly, the present invention relates to a method and apparatus for activating a group widget between a plurality of widgets.

2. Description of the Related Art

A widget exists in a device, and is used for an interface with a user and execution of a specific function of a corresponding device. Such widgets separately exist in each device.

SUMMARY OF THE INVENTION

An aspect of the present invention is to address at least the above-mentioned problems and/or disadvantages and to provide at least the advantages described below. Accordingly, an aspect of the present invention is to provide a widget activation and communication method between a plurality of widgets.

In accordance with an aspect of the present invention, a method for activating a group widget by a widget client is provided. The method includes receiving widgets from at least one surrounding widget server, analyzing the received widgets and grouping the widgets according to the result of the analysis, generating grouped widgets as a group widget; if an event is received from a user, converting a received event into an event related to a configuration widget of a group widget, transmitting the converted event to a corresponding widget server, and receiving a processing result from the widget server which received the transmitted event.

In accordance with another aspect of the present invention, an apparatus for activating a group widget is provided. The apparatus including at least one widget server for transmitting widgets, a widget client comprising a widget manager for receiving widgets from at least one surrounding widget server, for analyzing the received widgets and for grouping the widgets according to the result of the analysis, for activating grouped widgets as a group widget, for converting a received event into an event related to a configuration widget of a group widget, if an event is received from a user, for transmitting the converted event to a corresponding at least one surrounding widget server, and for receiving a processing result from the at least one surrounding widget server which received the transmitted event Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide an improved widget that communicates between different devices and suggests a solution by the following requirements:

Widget communication between different devices

Widget context and mobility between devices

Widget set, widget reliance, and widget activation from other widgets

A plurality of widgets of one interface and a plurality of bindings

Other various matters to be corrected

Widget Communication Between Devices

A widget manager relies on a binding phase whenever a new widget is activated or a new device is searched. All non-binding interfaces are collected and systematic searches for new matches are generated and executed. All of the new matches are drawn as a new binding phase, which is operated for binding two widget interfaces between the same widget managers, and operated for binding a searched service and a widget interface.

In order to enable the binding of the widget interfaces through the widget manager and/or devices, the widget interface needs to be searched through the widget manager and/or devices. To this end, one method is to provide a searchable service that can be searched from a definition of the widget interface.

However, the definition of the searchable service may generate additional costs. Moreover, widget interfaces to be locally bound (i.e., binding widget interfaces between the same widget managers) do not need a wrapper. Providing a wrapper service for all interfaces makes the binding phase unnecessarily complicated regardless of how all interfaces are bound.

Furthermore, some interfaces do not need to be exposed outside of the widget manager.

Such need for exposure is related with the widget and the meaning of the interface. Since the widget manager need not know anything about the meaning of the interface, the provisioning of information may be limited.

With respect to each interface, a determination is made as to whether it is necessary to indicate the interface as searchable. The indication is compulsory, so the binding phase may be simplified. If it is determined that the interface is indicated as searchable, the widget manager does not attempt to locally bind. If it is determined that the interface is not indicated as searchable, the widget manager attempts to locally bind, and does not inform of such an existence on the network.

According to an exemplary embodiment of the present invention, the attribute mw:discoverable is added to an element "mw:interface".

A secondary Boolean value indicates whether the interface may be informed on the network like the searchable service, and the default value is false. Hence, other widgets in other widget managers on the network will be bound with the above-described interface. When a search is possible, the interface cannot be locally bound.

Widget Context and Session Mobility

In a case where a widget has context and session mobility, the context for the widget is related to a "save and restore" command which saves a user's preference, the widget's execution state, and the like.

For example, a user selects a current position from a traffic widget or a weather widget, and desires to make the widget always display information when the widget is activated.

In a local execution state, use of the widget may be complicated. For instance, a log-in phase should exist, and three-page information should be passed in order to obtain the information. A user may execute the widget once, and it is expected to return to the same state in a next period when the user re-executes the widget. Accordingly, the use of the widget in the local execution state is similar to complicated preferences.

In a remote execution state, a user uses a reservation widget in a phone, and suddenly the display screen becomes very small. The user may then desire to switch from using the phone to using a computer or a TeleVision (TV) set that has a wider screen in order to view display options of the reservation widget. Hence, the user extends the widget and its context to an apparatus having a large screen. The use of the reservation widget in a phone is similar to the local execution state, but it is required for a context file to be extended as a new apparatus along with the widget.

The following needs to be defined:
What should be saved for the declarative-only state
Whether data needs to be saved in a certain format
When the command "save and restore" should be executed
Where information is saved, and how the information can be found before restored.

A field or attribute value may be stored when it is in a simple declarative context. In such a case, a description of the context includes a list of a stored field or attribute value and names of corresponding elements in such a context. When the widget includes a script, anything may be stored and an internal variable/state of the script is also included.

When the widget manager loads again the information written by the widget manager itself for the local use (i.e., priority or execution state), no definition of the format is necessary.

However, if context files are to be exchanged between widget managers on other devices, other platforms or operating systems, in the state where a script is relied on, a simple text format for exchange of the context is proper.

A "save and restore" command does not rely on an application and is automatically managed by the widget manager. However, explicit triggering of context storing may occur.

An issue of the space where the context is stored is not generated in the local execution state. Only in the session mobility, the context needs to be located between the widget manager and devices. According to an exemplary embodiment of the present invention, the following files are suggested:

A separate file having standard Uniform Resource Locator (URL)
A separate file having URL in a manifest/context element The following definitions of various contexts are suggested.

Widget Context

The context of the widget is a data set that is used to regenerate a current state of the widget in case the widget is deactivated or reactivated. The context is stored as a file, and the name and the value of the context file are stored together. The context may be used in two environments.

When a script is used, the format of the context file is not described, and the script exists only in an Extensible Markup Language (XML) format. If the script does not exist, the following XML format may be used. A single upper element <context> would include the number of a <param> element along with "name" and "value" which are compulsory attributes.

Persistent Context

When a user terminates the widget, if it is desired for the function to be resumed in the same state by the widget, the context is continually signaled. In a last part of widget activation, the context file will be loaded again. Before widget deactivation, a new context is stored in the context file.

Session Mobility

If it is desired for the widget to move from one device to another device while keeping an execution state, a context file should be generated so that the file may be used in an object device.

Hence, according to an exemplary embodiment of the present invention, a context description <mw:context> element in a manifest portion of the widget is provided. The <mw:context> element confirms whether there is a need of a widget for execution context.

The execution context is a set of information related to a current state of the widget.

The widget is operated as follows. If it is considered that the current state of the widget has a lasting state, it is required for the widget to be stored and terminated. Further, if the session mobility is executed, the widget is transmitted to another device. The context is made in such a manner that it is possible to approach a Uniform Resource Identifier (URI). The URI is made as an URI of the widget, and the context is recorded as follows.

Context:

The context is a sub-element of <content> element.

Expected children (in any order):

The context includes one or more <mw:input> elements.

In a case of non-scripted, in the context file, the name of <mw:input> is mapped to the name of the <param> element. In addition, the value of the <param> element is synchronized with a <scene> element, and the <scene> element is described in a "setAttribute" attribute of the <mw:input> element.

Attributes:

An essential attribute mw:type indicates a type of an indication context, which is one of "persistent" and "transient". If the attribute of the context is "persistent", the context is stored and terminated. Then if the widget is reloaded, the reloading is done.

Option attribute mw:saveTrigger indicates the name of the <scene> element generation. The name of the <scene> element generation is used in triggering the context storing.

Widget Aggregation

Widget aggregation is reuse of the widget. For example, within another widget, if one widget is a file dialog, the widget is called by another widget that needs the file URL.

Next, various aspects may exist as follows.

Item 1. Widget A is activated by widget B. Otherwise, widget B requests a current state for a general function of widget A.

Item 2. Widget B requests deactivation of widget A after a certain time period or a certain action.

Item 3. Widget B desires a change of widget A in any manner.

Item 4. Widget B desires to push widget A to another device. For example, widget B executes a TV set. Here, the TV set is a TV without a touch screen function, and while widget A maintains connection with widget B, widget B pushes widget A to a portable terminal having a touch screen function in order to provide a touch screen function.

Item 5. Widget B desires to control position of widget A while widget B is activated.

Item 1 is an important characteristic configuration of BONDI. BONDI is a set of script interfaces for the use of a mobile platform. Such a configuration has a serious potential risk when not strictly controlled. Hence, only the widget should write the list that represents activation or deactivation. According to an exemplary embodiment of the present invention, this is done through a silent syllable.

The use of a silent syllable is described as follows. The list of widget B describes that widget B relies on widget A, and wherein widget A and the interface are shared. Widget B, which declared interface X, makes activation of widget A possible. At this time, widget A declares mapping with interface X. The activation is done by requesting the widget manager to execute a widget that executes the service of interface X. Triggering of the activation becomes possible by using a script or through a declaration event.

Item 2 is addressed in a similar manner as in item 1.

If there is any change within the <scene> element of widget A, item 3 is addressed through a general use of a bound interface.

In order to address item 4, a signaling, which is pushed or exported to another device, is necessary. According to an exemplary embodiment of the present invention, <mw:component> element is provided.

The <mw:component> element is used for identification with other widgets which belong to the widget. As soon as the list is loaded, the widget manager obtains the list of this component widget without loading or activation of the actual component widget.

Context:

This is the sub-element of <content> element.

Expected children (in any order):

None.

Attributes:

mw:src

An essential elements mw:src indicates an URI of a component widget.

mw:id

An essential element mw:id indicates an identifier of component widget.

mw:exportable

Option Boolean value. Default value is false. The mw:exportable element indicates whether the component widget will be pushed to another device.

mw:activateTrigger

Option. The mw:activateTrigger element indicates the name of scene generation. The name of the scene generation is used in triggering activation of component widget.

mw:deactivateTrigger

Option. The mw:deactivateTrigger element indicates the name of scene generation. The name of scene generation is used in triggering deactivation of component widget.

mw:activatedAction

Option. The mw:activatedAction element indicates the name of scene generation. It is used to receive notification of a successful activation of the component widget.

mw:deactivatedAction

Option. The mw:deactivatedAction element indicates the name of scene generation. It is used to receive notification of the deactivation of component widget.

InterfaceHandler script interface is added as shown in the following Table 1.

TABLE 1

| readonly attribute DOMString boundStatus; |
| --- |

InterfaceHandler script interface is added. A "boundStatus" indicates the binding state. For example, the "boundStatus" indicates whether the external communication entity by an object is a Universal Plug and Play (UPnP) server or widget. In addition, it indicates the state of whether the widget is activated.

The following Table 2 is added to the widget interface.

TABLE 2

| void activateWidget(DOMString componentID); |
| --- |
| void deactivateWidget(DOMString componentID); |

An "activateWidget" method is used as an identifier of a widget component. This secures the activation of the component widget. In case there is a chance that one widget uses another widget, this is useful when a component element is declared without actual loading or activation. Before transmitting a message, it is necessary for the component widget to be loaded.

A deactivateWidget method is used as a component identifier, and is for guaranteeing deactivation of the component widget. The deactivateWidget method may be used by the widget which activates one widget.

Add to the mw:interface element:

mw:connectTo

The above optional string without a default value indicates whether the interface will be made to be matched with the interface of the named component other than matching interfaces.

A Plurality of Examples and Binding

In a first use example, Widget A is a light switch. Widget A has a command interface for toggling UPnP light. Widget A may be designed to operate for one or more lights. The interface is allowed to bind a plurality of UPnP light services. Widget A can be illustrated only once.

In a second use example, Widget B is a light switch. Widget B has a command interface for toggling one UPnP light. Widget B may be designed to operate for only one light. The interface is allowed to bind a single UPnP light service. The widget B may be illustrated once for each found UPnP light.

Depending on a user's desire or need, any combination of the above examples is possible. It is suggested that the above examples are defined in each interface. By default, the interface can be bound only once unless indicated by another method.

According to an exemplary embodiment of the present invention, a boolean field mw:multiBind is added to "mw:interface:".

Loop Evasion

If outputTrigger and InputAction of an arbitrary message have the same value, the arbitrary message is triggered to an infinite loop. In order to avoid the triggering to an infinite loop, a natural response is to try to use a configuration, so it is preferred to prohibit the infinite loop.

According to an exemplary embodiment of the present invention, the following sentence is inserted to "messageIn" and "messageOut":

If both attributes are specified, the value of the outputTrigger and the InputAction will be different.

Missing Parameter

If an output argument is selective among services, the output argument may be missing in the message. If the script is connected in the widget, the function has a parameter that requires a value. In such a case, if "mw:default attribute" is provided, the value will be used.

If there is no input element in an interface declaration that matches the output element present in a service interface, the binding should continue with an assumption that the widget will not use the parameter. It is suggested that the explanation will be written in semantics of "mw:input".

If the output argument of a message is a constant, it is useless to connect the output argument to a constant field of the useless scene. As a result, it is suggested that the constant attribute is added to "mw:output".

According to an exemplary embodiment of the present invention, when there is no input element in an interface declaration that matches the output element present in the service interface, the binding continues with the assumption that the widget will not use the parameter.

In addition:

mw:default

It is possible to select the attribute as one without a default value. It indicates the default value that should be provided to a scene in case the incoming message does not include a value for parameter matching (i.e., in case of the selective parameter).

Addition of "mw:output"

mw:constant

The attribute is selective, and does not have a default value. The default value does not need a scene tree connection of the widget. If a constant value is provided to the message activation, the parameter value is indicated.

XML Prefixes in the Attribute Name

In a case of a XML description having namespace, the name of the attribute may include a namespace prefix (e.g., xlink). If the attribute name needs to be mentioned in the "conFIG.xml" file, the attribute needs to be analyzed in the context of scene description. However, there is a chance that the prefix is analyzed in the context of the "conFIG.xml" file.

According to an exemplary embodiment of the present invention, in a case of XML description having namespace, if the name of the attribute includes namespace prefix (e.g., xlink), the prefix is analyzed within the scene description document that the URL is given in an src attribute of the contents element in the widget configuration. The prefix will be understood within a configuration document.

Widget Aggregation or Grouping Widget

In a widget grouping as used above, there can be several classified elements.

For example, a Digital TeleVision (DTV), a Digital Video Disc (DVD) player, a 5.1 sound system and a light adjustment switch exist on a home network. Each of the DTV, the DVD player, the 5.1 sound system and the light adjustment switch include a widget. In all widget-based devices (i.e., the DTV, the DVD player, the 5.1 sound system, and the light adjustment switch), connectivity is provided as a Digital Living Network Alliance (DLNA) home network environment. According to an exemplary embodiment of the present invention, the DTV widget, the DVD player widget, the 5.1 sound system widget, and the light adjustment switch widget expressed on the DTV are activated as a group widget, thereby providing user convenience by controlling widgets connected to various devices through a user's simple and easy operation.

In this case, there is a module which is in charge of a widget manager function, and each device includes a widget that may express the function of each device.

Here, the widget includes at least one of the logics that may perform a Graphical User Interface (GUI) attribute and a certain function which is expressed in a screen. The attribute and the logic are modules in which mutual integration and separation is possible. Transmission and communication are possible in the widget including the attribute and the logic.

The super-template widget may be provided and the above described function of each device may be provided.

In such a case the super-template widget exists on the DTV, and the widget manager of the DTV may activate one group widget by connecting the simple widget, which are elements of the widgets found in the home network, to super-template widget information. For example, a group widget may be activated by some selected widgets or all of the widgets of the DTV, the DVD player, the 5.1 sound system, and the light adjustment switch.

The activated super-template widget may operate as an independent widget, and the independent widget may be transmitted to another device (i.e., the DTV, the DVD player, the 5.1 sound system, and the light adjustment switch).

TABLE 3

Template-based, Widget Creator/ Widget Manager support the task template before the Grouping Widget.

<mw:template>
  <mw:super-template>
    <mw:simpleA>
    <mw:simpleB>
    <mw:simpleC>
  </mw:super-template>
</mw:template>

Additionally, the example of the above super-template widget and the simple widget expresses a mutual relation, and may be expressed as master/slave structure and the like. The widget may be integrally/separately applied as the GUI and the function element. In addition, the GUI and function element of the widget may be divided into element units that constitute the widget.

TABLE 4

- Element-based Widget Manager can select the element by defined aggregation attribute

```
<mw:component aggregate ="true">
<mw:messageIn name="setSize"inputAction="setWidthAndHeight">
<mw:input name="width"scriptParamType="number"/>
<mw:input name="height"scriptParamType="number"/>
<mw:output name="errorCode"scriptParamType="number"/>
</mw:messageIn>
</mw:component>
```

TABLE 5

-Master/Slave-based

```
</mw:interface>
<mw:interface type="urn:mpeg:systems:widgets:core:out"
aggregate="master">
<messageOut name="setSize">
<output name="width"scriptParamType="number"/>
<output name="height"scriptParamType="number"/>
</messageOut>
</mw:interface>
<mw:interface type="examples" aggregate="slave">
<mw:messageOut name = "messageA" outputTrigger="unloader.click"
inputAction="nodeID.end">
<mw:output name="name"attributeModified="eltAName.textContent"/>
<mw:output name="value"attributeModified="
eltBValue.textContent"/>
<mw:input name="returnCode"/>
</mw:messageOut>
</mw:interface>
```

A new widget may be activated by analyzing features and related information of each widget by the widget manager on the DTV.

As described above, the features and related information for each module are selected by searching and analyzing each widget by the widget manager on the DTV.

The widget manager analyzes collected information, for example, a connection-able relation by GUIs and an execution-able relation by functions for each module. The related information denotes feature information by functions.

The DTV, the DVD player, the 5.1 sound system, and the light adjustment switch widget exist, and it is assumed that each widget has a representative function as follows. That is, it is assumed that the DVD player has a function of replaying the DVD, the DTV has a function of adjusting vertical or horizontal rates of a display screen (16:9 or 4:3), and the light adjustment switch has a function of turning the light on or off. The widget manager may activate one function which integrates the above functions by searching and analyzing such widgets and collecting related information of each widget. For example, the widget manager activates a function of "viewing a DVD movie". If a user selects this function, new functions of replaying the DVD of the DVD player, adjusting vertical and horizontal rates of a screen of a DTV, and turning off the light of the light adjustment switch in order to view a movie on the display screen. This means that a new function may be performed according to the combination and function analysis for each function.

TABLE 6

- Task-based (something like a table structure), Widget Manager already know the relationship between each group.

```
<mw:group>
<mw:aggregation category="UPnP AV"id="widget_TV"
relationship="T1">
<mw:interface type="setPlay( )">
</mw:group>
<mw:aggregation groupList="T1">
<mw:relationship name="UPnP MS"id="
</mw:aggregation>
```

As explained above, an exemplary embodiment of the present invention provides a group widget between widgets and a communication method by defining a widget manager or elements of each widget in a method of generating and communicating a group widget.

According to an exemplary embodiment of the present invention, a <mw:component> element is provided.

The <mw:component> element is used in identifying another widget which is dependent on a component widget. As soon as a list is loaded, the widget manager obtains the list of this component widget without loading or activating the actual component widget.

Context:

This is a sub-element of <content> element.

Expected children (in any order):

None.

Attributes:

mw:super-template

An essential element mw:super-template indicates Super-Template widget.

mw:simpleID

An essential element mw:simpleID indicates the identifier of a searched component widget.

Figure 1:
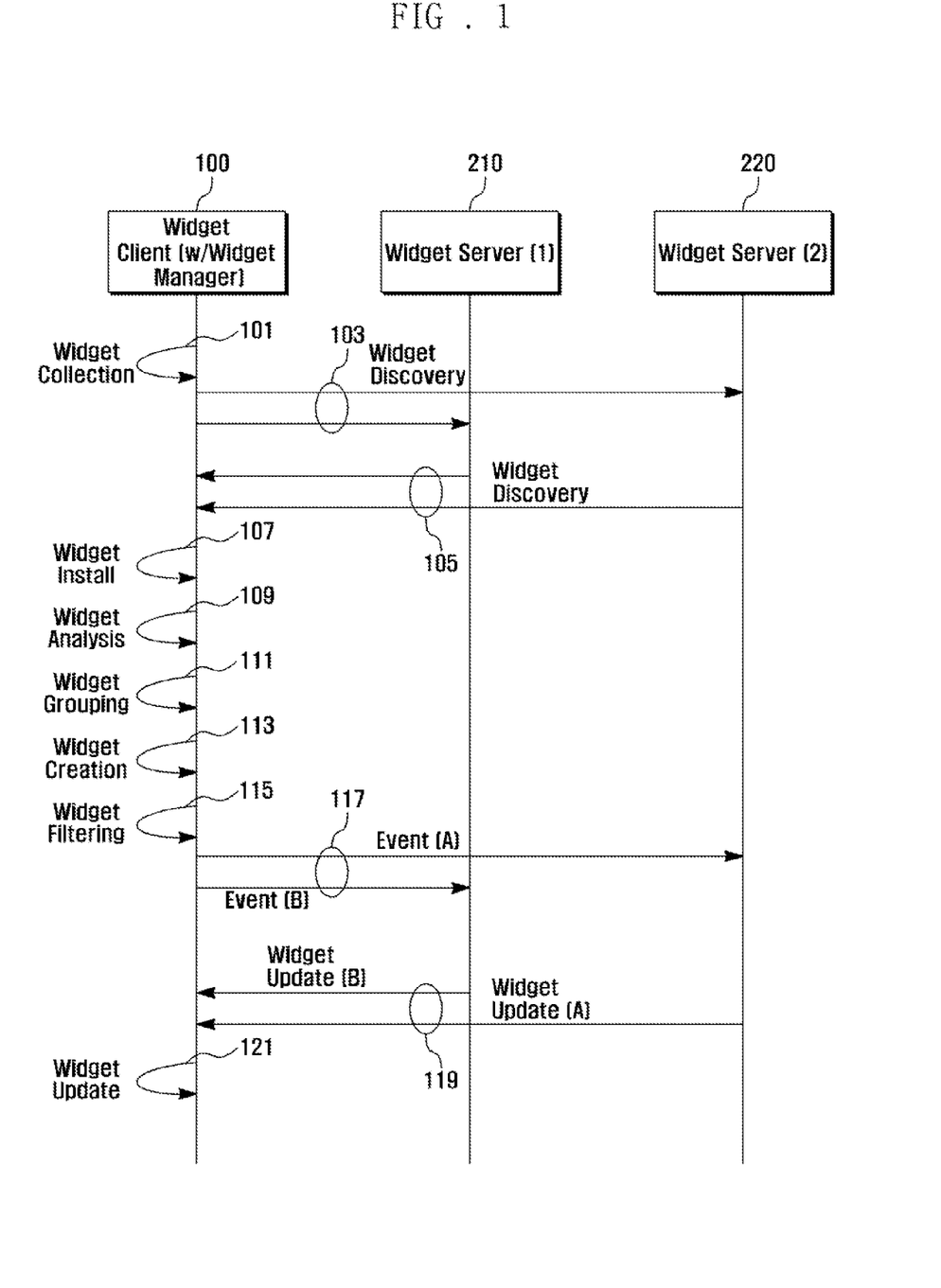
FIG. 1 illustrates a method for activating a widget according to an exemplary embodiment of the present invention.

FIG. 1 illustrates a method for activating a widget according to an exemplary embodiment of the present invention.

Referring to FIG. 1, it is assumed that a Digital TeleVision (DTV), a Digital Video Disc (DVD) player, a 5.1 sound system, and a light adjustment switch respectively exist, and each device includes a widget.

A widget client 100 may be one of the widgets of the DTV, the DVD player, the 5.1 sound system, and the light adjustment switch. More particularly, the widget client 100 includes a widget manager and a super template. In addition, a widget server (1) 210 and a widget server (2) 220 may be one of the widgets of the DTV, the DVD player, the 5.1 sound system, and the light adjustment switch. In FIG. 1, it is assumed that the widget client 100 includes the DTV, the widget server (1) 210 includes the DVD player, and the widget client (2) 220 includes the light adjustment switch.

The widget client 100 activates a widget collection command event in step 101. Then, a widget manager of the widget client 100 performs a widget locating process that locates surrounding widgets in step 103. At this time, in the widget locating process, it is assumed that the widget client 100 located widget server (1) 210 and widget server (2) 220.

The widget server (1) 210 and the widget server (2) 220 provide their widgets to the widget client 100 in step 105. That is, the widget server (1) 210 and the widget server (2) 220 transmit the widgets to the widget client 100.

The widget manager of the widget client 100, which received the widgets, installs a corresponding widget in step 107. That is, the widget manager extracts data from the received widgets.

Then, the widget manager of the widget client 100 analyzes the installed widget in step 109. That is, the widget manager analyzes a corresponding widget through extracting metadata for a group widget such as features, related information, and the like, of the widget.

The widget manager of the widget client 100 performs a widget grouping for a group widget activation by collecting a related widget in step 111. At this time, the grouping may be performed based on a preset standard based on the analysis of the widget. At this time, the grouping denotes selecting the related widget and a user-specified group widget. It may be illustrated that attributes and functions of the widgets are related as an example of the related widget. In addition, the user-specified group widget denotes that a user sets corresponding widgets to be grouped.

The widget manager of the widget client 100 activates a previously grouped widget as a group widget in step 113. At this time, the widget manager activates the group widget using the super template. The group widget may be activated by including a corresponding widget in elements "<mw:simpleA>", "<mw:simpleB>" and "<mw:simpleC>" of Table 3. At this time, it is assumed that one of the group widgets has a "viewing a DVD movie" function including a function for adjusting vertical and horizontal rates of a display screen of a DTV, a function for replaying the DVD of the DVD player, and a function for turning on and off the light of the light adjustment switch.

At this time, it is assumed that the user selects the "viewing a DVD movie" function. The "viewing a DVD movie" event is then activated by the user. The widget manager of the widget client 100 performs filtering that classifies a group widget event into events for each widget through events received from the user in step 115. That is, the DVD movie viewing is classified into a change event of the vertical and horizontal rate of the display screen into 16:9, a DVD replay event, and a light turn-off event. The group widget event is related with one widget event.

The widget manager of the widget client 100 transmits an event for performing the function of each widget, which is classified through filtering in order to perform a corresponding function in step 117.

Each widget server 210 and 220, which received the event, processes the event, and transmits the result of the event processing to the widget manager of the widget client 100 in step 119. The widget manager of the widget client 100 processes the event based on the transmitted processing result in step 121.

That is, if the DVD is replayed, the light is turned off, the processing result is transmitted to the DTV in each widget server 210 and 220, and the DTV changes the ratio of the display screen from 6:4 to 16:9.

Figure 2:
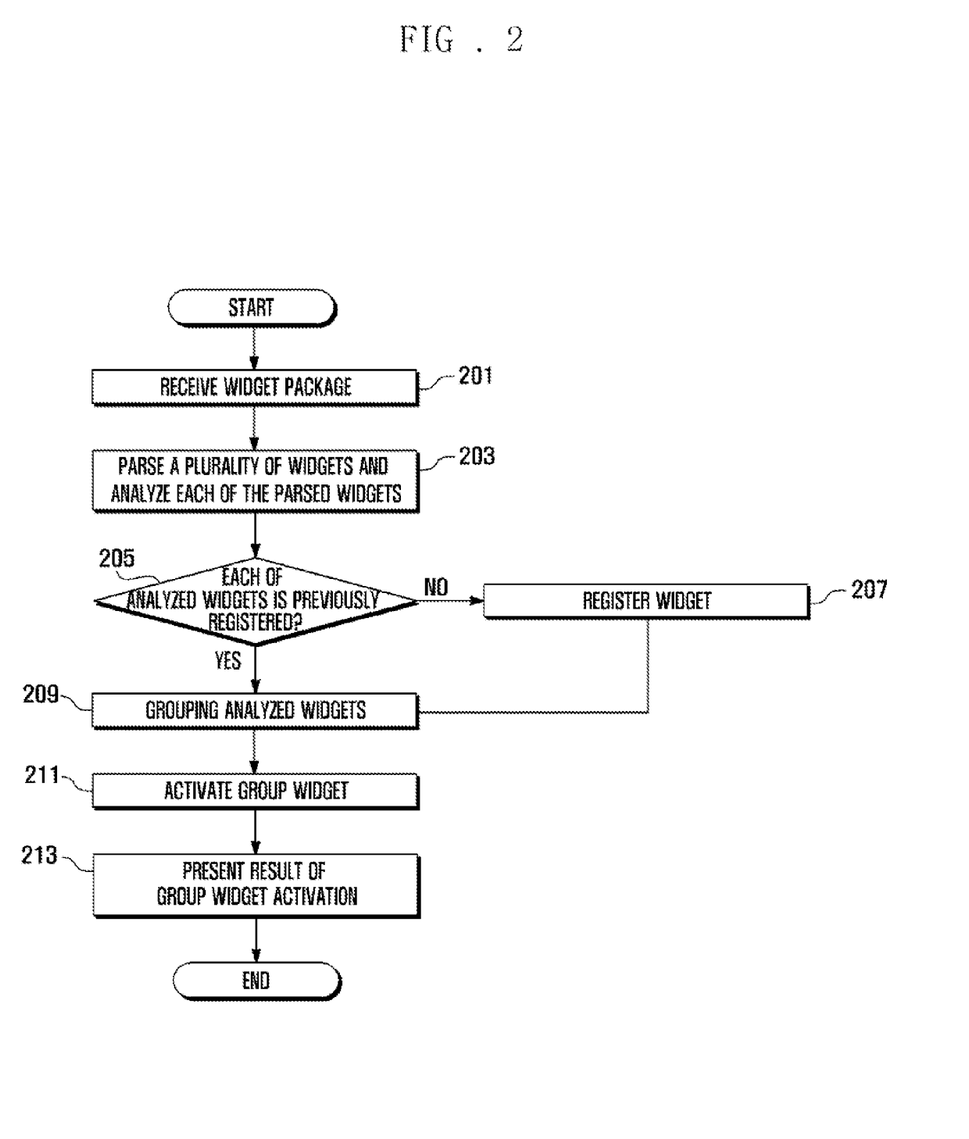
FIG. 2 illustrates a method for activating a widget group according to an exemplary embodiment of the present invention.

FIG. 2 illustrates a method for activating a widget group according to an exemplary embodiment of the present invention.

Referring to FIG. 2, a widget client receives a widget package including a plurality of widgets in step 201.

A widget parser of the widget client parses the plurality of widgets and analyzes each of the parsed widgets in step 203.

The widget client determines whether each of the analyzed widgets was registered in advance in step 205. If it is determined that a widget was not registered, registration occurs by the widget client to register the widget in step 207. The registration includes registering a widget library and metadata.

More particularly, when registered, the result of registration information analysis of related widgets and related data extraction is provided to the widget manager of the widget client 100. At this time, a list of grouping-possible widgets, and attributes and functions of each widget are stored depending on the result of the analysis.

The widget manager groups the analyzed widgets in step 209.

The widget manager is then activated based on the list of the grouping-possible widgets and function information in step 211.

At this time, the widget manager of the widget client activates a new or converted widget by distinguishing the super-template widget for a group widget activation from a function integration module. Generating a new widget by integrating the function of each widget may be performed with generation of a group widget at the same time or in order.

The widget client presents the generation result of the group widget to a user through a presentation engine in step 213.

Figure 3:
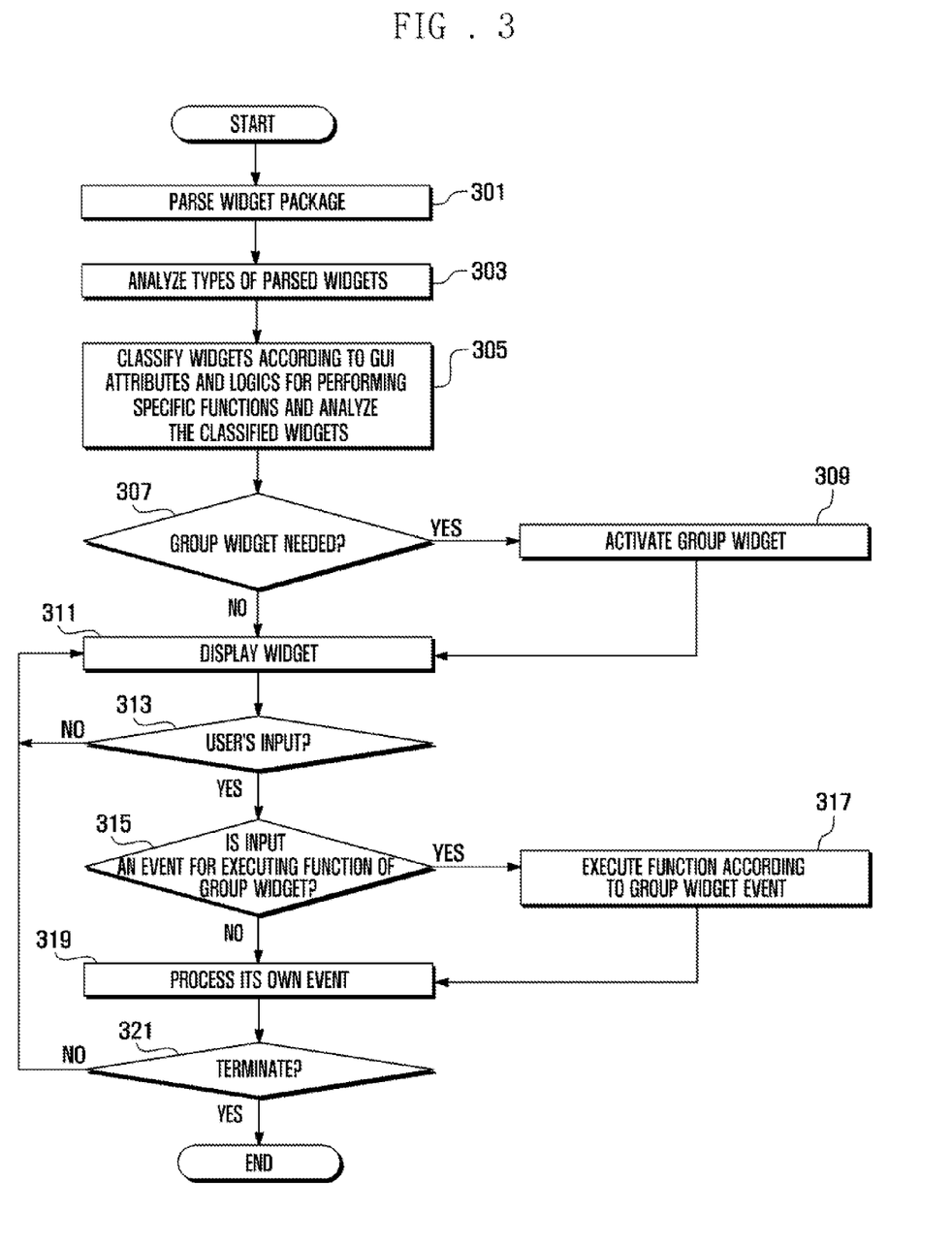
FIG. 3 illustrates a method for executing a group widget according to an exemplary embodiment of the present invention.

FIG. 3 illustrates a method for executing a group widget according to an exemplary embodiment of the present invention.

Referring to FIG. 3, if a widget client receives a widget package, the widget client parses the received widget package in step 301. The widget client then analyzes the types of parsed widgets in step 303. The widget client classifies the widgets according to GUI attributes and logics for performing specific functions, and analyzes the classified widgets in step 305.

The widget client determines whether a group widget is necessary in step 307. At this time, if it is determined that a group widget is necessary, a group widget is activated in step 309.

The widget client then displays the widget in step 311. If a group widget is activated, the group widget is displayed. On the contrary, if a group widget is not activated, a general widget is displayed. At this time, the group widget or the general widget is displayed through a presentation engine.

The widget client determines whether there is a user's input in step 313.

If it is determined that there is a user's input, the widget client determines whether the input is an event for performing a function of a group widget in step 315.

At this time, if it is determined that the input is an event for performing a function of the group widget, the widget client executes a function according to the group widget event in step 317. That is, the widget client extracts a simple widget event from the group widget event, and the extracted event is provided to each widget server. The widget client receives a response to the event processing from each widget server and processes the event for executing a function of the widget client in step 319.

Further, if a corresponding function is not an event for executing a function of a group widget, the widget client does not execute the function according to the group widget event in step 317, but processes the event for executing the function of the widget client in step 319. In step 321, the widget client determines whether the process is terminated. If it is determined that the process is not terminated, the widget client returns to step 311. If it is determined that the process is terminated, the widget client ends the process.

According to exemplary embodiments of the present invention, a widget communication method between devices is provided, widget context and mobility between devices is provided, a method for activating a widget from other widgets and a method for sharing one interface by a plurality of widgets are provided. Thereby, performance of a widget in a device of a home network is improved.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for activating a group widget by a widget client, the method comprising:
   receiving widgets from a surrounding widget server which is external to the widget client;
   in response to receiving the widgets, analyzing the received widgets and grouping the widgets according to the result of the analysis;
   activating the grouped widgets as a group widget; and
   if an event is received from a user, converting the received event into an event related to a configuration widget of the group widget,
   wherein the analyzing of the received widgets and the grouping of the widgets according to the result of the analysis comprises:
      extracting metadata from the received widgets; and
      grouping the received widgets using the extracted metadata, and
   wherein the grouping of the received widgets using the extracted metadata comprises grouping widgets having at least one of related attributes and functions among the received widgets.

2. The method of claim 1, wherein the receiving of the widgets comprises:
   discovering a widget server; and
   receiving a widget of the widget server from the discovered widget server.

3. The method of claim 1, further comprising:
   installing the received widgets between the receiving of the widgets from the surrounding widget server and the analyzing of the received widgets.

4. The method of claim 1, wherein the analyzing of the received widgets and the grouping of the widgets according to the result of the analysis comprises:
   parsing the received widgets; and
   analyzing the parsed widgets.

5. The method of claim 1, wherein the analyzing of the received widgets and the grouping of the widgets according to the result of the analysis further comprises:
   analyzing the received widgets;
   determining whether the analyzed widgets are previously registered; and
   registering the analyzed widgets if it is determined that the analyzed widgets are not previously registered.

6. The method of claim 1, wherein the analyzing of the received widgets and the grouping of the widgets according to the result of the analysis further comprises:
   analyzing the received widgets and extracting attributes and functions of the received widgets; and
   grouping the received widgets according to the extracted attributes and functions.

7. The method of claim 1, further comprising:
   displaying an activated group widget using a presentation engine after the activating of the grouped widget as a group widget.

8. An apparatus for activating a group widget, the apparatus comprising:
   at least one widget server having a controller configured to transmit widgets; and
   a widget client having a hardware controller configured to execute a widget manager for receiving widgets from at least one surrounding widget server, for analyzing the received widgets and for grouping the widgets according to the result of the analysis in response to receiving the widgets, for activating the grouped widgets as a group widget, and for converting a received event into an event related to a configuration widget of the group widget to configure the grouped widgets, if the event is received from a user,
   wherein the at least one widget server is external to the widget client,
   wherein the widget client extracts metadata from the received widgets and groups the received widgets using the extracted metadata, and
   wherein the grouping of the received widgets using the extracted metadata comprises grouping widgets having at least one of related attributes and functions among the received widgets.

9. The apparatus of claim 8, wherein the widget client locates a widget server and receives a widget of the widget server from the located widget server.

10. The apparatus of claim 8, wherein the widget manager of the widget client installs the received widgets between the receiving of the widgets from the at least one surrounding widget server and the analyzing of the received widgets.

11. The apparatus of claim 8, wherein the widget client comprises a widget parser for parsing the received widgets, and analyzing the parsed widgets.

12. The apparatus of claim 8, wherein the widget client analyzes the received widgets, determines whether the analyzed widgets are previously registered, and registers the analyzed widgets if it is determined that the analyzed widgets are not previously registered.

13. The apparatus of claim 8, wherein the widget client analyzes the received widgets, extracts attributes and functions of the received widgets, and groups the received widgets according to the extracted attributes and functions.

14. The apparatus of claim 8, wherein the widget client displays an activated group widget using a presentation engine after the grouped widget is activated as a group widget.

* * * * *